United States Patent

[11] 3,582,896

[72] Inventor Sigmund Silber
Elizabeth, N.J.
[21] Appl. No. 427,407
[22] Filed Jan. 22, 1965
[45] Patented June 1, 1971
[73] Assignee Bell Telephone Laboratories, Incorporated
New York, N.Y.

[54] METHOD OF CONTROL FOR A DATA PROCESSOR
9 Claims, 6 Drawing Figs.

[52] U.S. Cl. ........................................................ 340/172.5, 179/2, 179/18
[51] Int. Cl. ........................................................ G06f 9/12
[50] Field of Search ............................................ 179/16, 17, 18, 2; 340/172.5

[56] References Cited
UNITED STATES PATENTS
3,223,785 12/1965 Budlong et al. ............... 179/18

*Primary Examiner*—Paul J. Henon
*Attorneys*—R. J. Guenther and James Warren Falk

ABSTRACT: A stored program data processor is disclosed in which certain subroutines must be executed during predetermined real time intervals. These times are designated by clock controlled interrupt of the normal program processing sequence. A first table is provided in storage in which there are a number of words equal to the number of different real time intervals. Each of these words has a number of bit positions equal to the number of possible subroutines which could be called for in that interval. Each bit is correlated to a word in a second table which word is the address of one of the subroutines. Instructions are provided for operating the data processor to consult the word in the first table appropriate for each time interval and to execute the routines indicated in abbreviated manner by the presence of particular valued bits in the selected bit positions of the first table word.

CALL STORE TRANSFER TABLE FOR TIMETABLE PROGRAM

| | |
|---|---|
| P0 | ADDRESS OF FIRST INSTRUCTION IN SUBROUTINE A |
| P1 | ADDRESS OF FIRST INSTRUCTION IN SUBROUTINE B |
| P2 | |
| P3 | |
| P4 | |
| P5 | |
| P6 | ADDRESS OF FIRST INSTRUCTION IN SUBROUTINE C |
| P7 | |
| P8 | |
| P9 | ADDRESS OF FIRST INSTRUCTION IN SUBROUTINE D |
| P10 | |
| P11 | |
| P12 | |
| P13 | |
| P14 | |
| P15 | ADDRESS OF FIRST INSTRUCTION IN SUBROUTINE E |
| P16 | |
| P17 | |
| P18 | |
| P19 | |
| P20 | |
| P21 | |
| P22 | ADDRESS OF FIRST INSTRUCTION IN SUBROUTINE F |

INVENTOR
S. SILBER
BY [signature]
ATTORNEY

FIG. 3

CALL STORE TRANSFER TABLE FOR TIMETABLE PROGRAM

| | |
|---|---|
| P0 | ADDRESS OF FIRST INSTRUCTION IN SUBROUTINE A |
| P1 | ADDRESS OF FIRST INSTRUCTION IN SUBROUTINE B |
| P2 | |
| P3 | |
| P4 | |
| P5 | |
| P6 | ADDRESS OF FIRST INSTRUCTION IN SUBROUTINE C |
| P7 | |
| P8 | |
| P9 | ADDRESS OF FIRST INSTRUCTION IN SUBROUTINE D |
| P10 | |
| P11 | |
| P12 | |
| P13 | |
| P14 | |
| P15 | ADDRESS OF FIRST INSTRUCTION IN SUBROUTINE E |
| P16 | |
| P17 | |
| P18 | |
| P19 | |
| P20 | |
| P21 | |
| P22 | ADDRESS OF FIRST INSTRUCTION IN SUBROUTINE F |

FIG. 4

CALL STORE TIME TABLE FOR TIMETABLE PROGAM

| | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| ACT | / | | | | | | | / | | | | | | / | | | / | | | | | / | / |
| T0 | | | | | | | | / | | | | | | / | | | | | | | | | / |
| T1 | | | | | | | | / | | | | | | / | | | | | | | | / | |
| T2 | | | | | | | | / | | | | | | / | | | | | | | | | / |
| T3 | | | | | | | | / | | | | | | / | | | | | | | | / | |
| T4 | | | | | | | | / | | | | | | / | | | | | | | | | / |
| T5 | | | | | | | | / | | | | | | / | | | | | | | | / | |
| T6 | | | | | | | | / | | | | | | / | | | | | | | | | / |
| T7 | | | | | | | | / | | | | | | / | | | | | | | | / | |
| T8 | | | | | | | | / | | | | | | / | | | | | | | | | / |
| T9 | | | | | | | | / | | | | | | / | | | | | | | | / | |
| T10 | | | | | | | | / | | | | | | / | | | | | | | | | / |
| T11 | | | | | | | | / | | | | | | / | | | | | | | | / | |
| T12 | | | | | | | | / | | | | | | / | | | | | | | | | / |
| T13 | | | | | | | | / | | | | | | / | | | | | | | | / | |
| T14 | | | | | | | | / | | | | | | / | | | | | | | | | / |
| T15 | | | | | | | | / | | | | | | / | | | | | | | | / | |
| T16 | | | | | | | | / | | | | | | / | | | / | | | | | | / |
| T17 | | | | | | | | / | | | | | | / | | | | | | | | / | |
| T18 | | | | | | | | / | | | | | | / | | | | | | | | | / |
| T19 | | | | | | | | / | | | | | | / | | | | | | | | / | |
| T20 | | | | | | | | / | | | | | | / | | | | | | | | | / |
| T21 | | | | | | | | / | | | | | | / | | | | | | | | / | |
| T22 | | | | | | | | / | | | | | | / | | | | | | | | | / |
| T23 | / | | | | | | | / | | | | | | / | | | | | | | | / | |

METHOD OF CONTROL FOR A DATA PROCESSOR

This invention relates to data processors and more particularly to a method of controlling the performance of predetermined functions at specified time intervals.

The central control in many data processors is used not only for performing logical operations, but in addition for controlling the scanning of peripheral equipment for required information and the transmission of signals to the peripheral equipment to govern its operation. The sequential action of the control is generally determined by a predesigned program. While the program may specify the action of the control, very often it is impossible to determine how long a period of time is required to perform each function. For example, if a data processor is used in a telephone central office for controlling all of the required switching actions, it is necessary for the control to scan lines for service requests and dial pulses. The total time required for one of these scans each time it is performed depends on the number of lines requesting service or the number of lines in the dialing state. Thus the scanning time may vary over a relatively large range depending on the instantaneous traffic through the office.

Certain functions must be performed at regular time intervals. For example, if a particular line is in the dialing state the line must be scanned for dial pulses at a rate greater than the rate of the dial pulses themselves. Otherwise, some of the dial pulses will be missed. Suppose it is determined to scan the lines for dial pulses once every 10 milliseconds. If there is no way to insure that the dial pulse scan program begins every 10 milliseconds, it is possible for some of the dial pulses to be lost. If the system is controlled solely by a program and there is no way for predetermined subroutines to be initiated at fixed times, too long a time interval may elapse between successive executions of dial pulse scans if the machine gets tied up in the executions of other subroutines. For this reason it is often necessary in data processing systems to control the initiation of predetermined subroutines at fixed instants of time.

While most of the system operation is determined by the program, there must be some way to modify it by time-dependent program control circuitry. For example, a mechanism may operate in accordance with clock pulses and may interrupt the normal executions of orders when it is determined that predetermined subroutines must be executed. The problem with this approach is that the predetermined subroutines may have to be executed at different multiples of time. In addition, it may be determined after the initial design of the machine that additional subroutines must be executed at fixed multiples of time. The time-dependent program control mechanism may not only increase in complexity with the number of subroutines which must be executed at fixed time intervals, but in addition may have to be modified in the course of time as it is determined to add subroutines to the list of those whose executions are required at fixed time intervals.

It is an object of this invention to control the executions of predetermined subroutines at predetermined rates with a minimum of time-dependent program control circuitry.

It is another object of this invention to control the executions of the predetermined subroutines at respective fixed rates of time in such a manner that the predetermined subroutines and their respective rates may both be changed without requiring any modification in the structure of the computer itself, all changes being controlled by changing data words stored in the machine.

In accordance with the principles of my invention the determination of which subroutines must be executed at which instants of time is made by a "timetable" program. The only time-dependent program control circuit which is required is one which controls a transfer to the first instruction in the timetable subroutine at the beginning of each successive time interval of preselected duration. In the illustrative embodiment of the invention this time interval is 5 milliseconds. At the beginning of every 5-millisecond interval a transfer is made to the first instruction in the timetable program.

The data storage unit in the illustrative embodiment of my invention includes two tables. The first of these is a "transfer table." This table includes, for each of the subroutines which must be executed at a fixed rate, an entry which is merely the address of the first instruction in the respective subroutine. The second table is a "time table." This table includes entries for each of the subroutines which must be executed at a fixed rate, which entries for each subroutines represent multiples of the basic 5-millisecond rate. A typical subroutine might include three entries specifying that it is to be executed in a first 5-millisecond interval, again in a 10th 5-millisecond interval and again in a 16th time interval. In the illustrative embodiment of the invention a maximum of 24 entries are possible in the timetable for each subroutine. Thus each subroutine may be executed any number of desired times within the basic cycle of 120 milliseconds. The timetable program itself is executed at the beginning of each 5-millisecond interval. The program controls the examination of both the timetable to determine which subroutines must be executed in each 5-millisecond interval and the transfer table to determine where the first instruction in each subroutine is stored.

Thus the only time-dependent program control mechanism required is that which controls the execution of the timetable program at the beginning of every 5-millisecond interval. The method is exceedingly flexible. To control the executions at predetermined time intervals of additional subroutines it is only necessary to add entries in the time table and the transfer table. Similarly, if it is determined that a particular subroutine need not be executed at a fixed rate it is only necessary to remove the respective entries from the two tables. The rate at which each subroutine is executed, i.e., the number of times it is executed in each basic 120-millisecond period may be changed merely by modifying the entries in the time table.

The method of the invention is described with reference to the telephone system disclosed in the application of Doblmaier et al., Ser. No. 334,875, filed Oct. 31, 1964. Accordingly, the timetable program described in detail below is necessarily based on the order structure of the central control in the Doblmaier et al. system. However, the method is equally applicable to other systems. It is only necessary to provide an equivalent time-dependent program control circuit and to program the machine so that the same method is practiced.

It is a feature of this invention to provide a time-dependent circuit for causing the control of a data processor to transfer to a timetable program at the beginning of successive preselected time intervals.

It is another feature of this invention to provide timetable data in the data storage unit of the machine, which data represents the time intervals during which predetermined subroutines must be executed.

It is another feature of this invention to control the examination of the timetable data in accordance with the timetable program to determine which subroutines must be executed during each time interval.

It is still another feature of this invention, in the illustrative embodiment thereof, to control the transfer to the subroutines which must be executed in each time interval during the overall execution of the timetable program itself.

Further objects, features and advantages of this invention will become apparent upon consideration of the following detailed description in conjunction with the drawing, in which.

Figure 1:
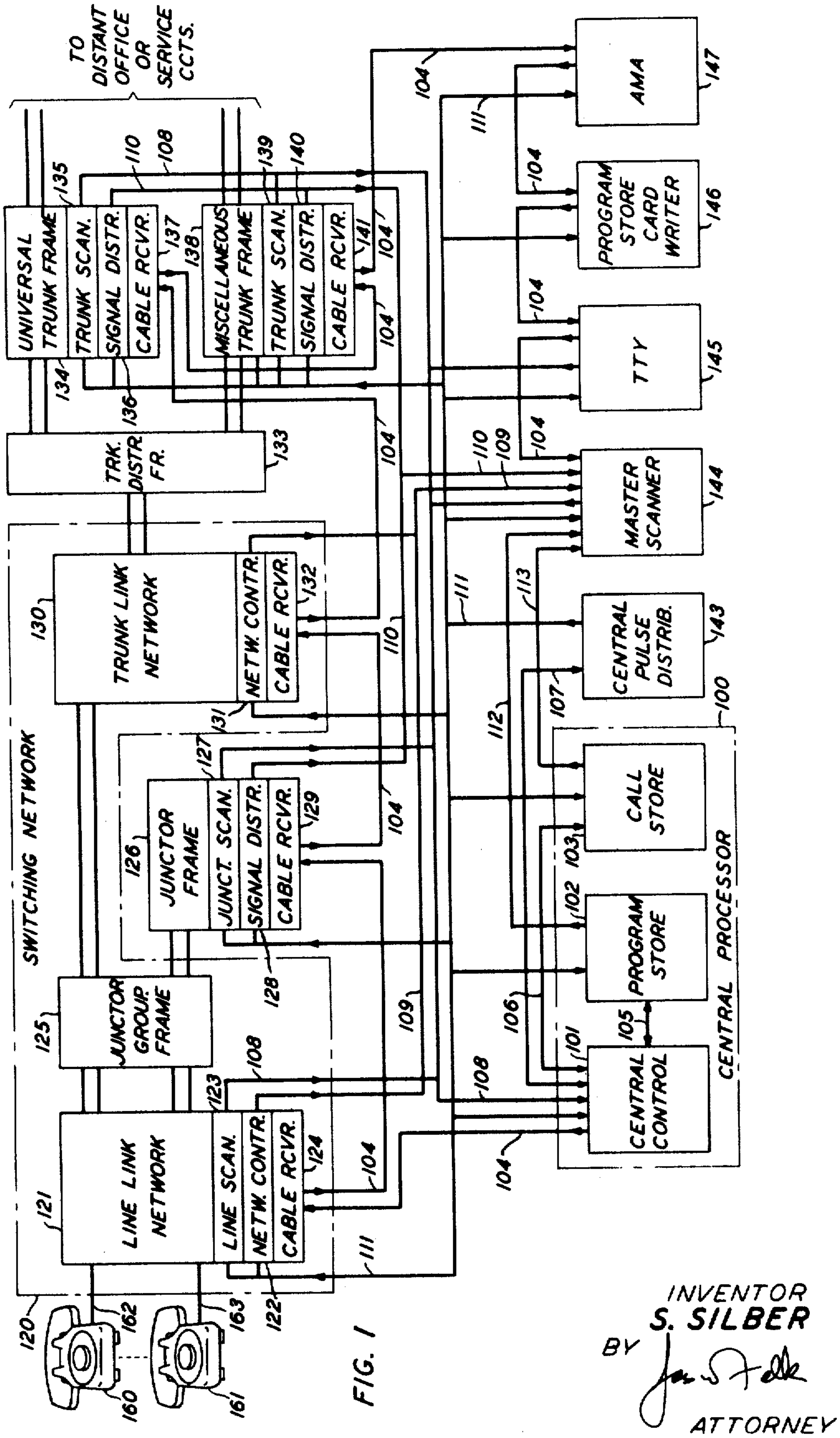
FIG. 1 is the same as FIG. 1 in the above-identified Doblmaier et al. application and is a general block diagram of the switching system disclosed therein.
Figure 2:
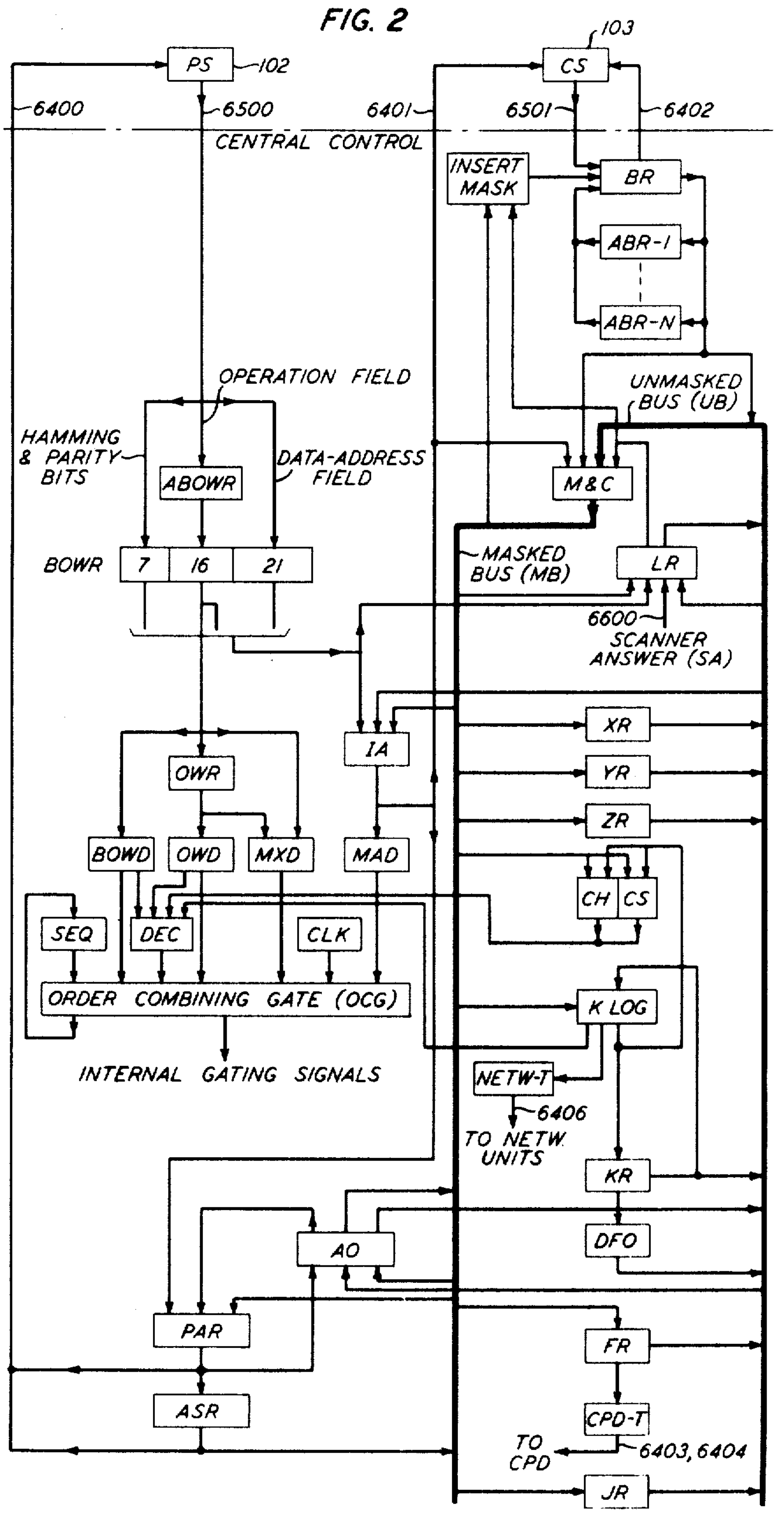
FIG. 2 is the same as FIG. 9 in the Doblmaier et al. application and is a simplified schematic representation of the central control disclosed therein.
Figure 5:
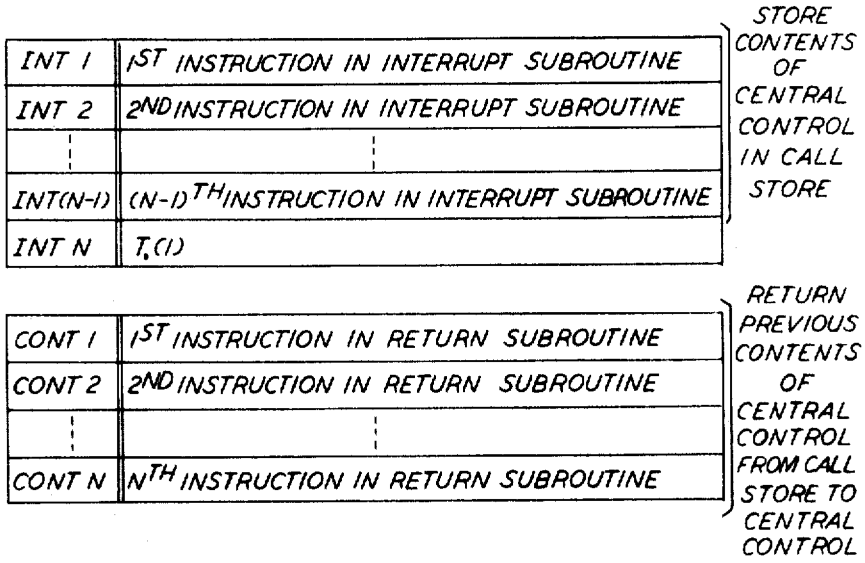
Figure 6:
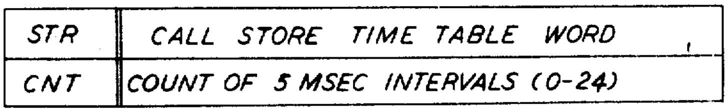

FIG. 3, the transfer table used in the illustrative embodiment of the invention, represents a series of data words contained in call store 103 of FIGS. 1 and 2;

FIG. 4, the time table used in the illustrative embodiment of the invention, represents another series of data words contained in call store 103;

FIG. 5 symbolically shows two subroutines, INT and CONT, contained in program store 102 of FIGS. 1 and 2; and FIG. 6 shows two locations, STR and CNT, in call store 103.

For an understanding of the present invention it is necessary to describe only briefly the telephone system of FIG. 1. The central processor 100 includes a central control 101, a program store 102 and a call store 103. The program store contains the less volatile system information including the system programs. The call store contains the more volatile system information, e.g., information relating to calls in progress, subscriber and trunk busy-idle information, network path busy-idle information, etc. The central control is the element which governs the system operation. Its action is determined by the instructions in the program store and the data contained in the call store. The central control governs the scanning of various supervisory points in the system and the transmission of control information to the peripheral equipment. In accordance with the instructions executed, the central control determines the appropriate action to be taken for particular combinations of information contained in the call store and scan information received from the peripheral equipment. The action taken includes not only the transmission of control information to the peripheral equipment but in addition the up-dating of the call store.

The operation of the central control is determined by the successive instructions executed. As described above, were there no way to guarantee that certain subroutines would be executed within fixed time intervals, the machine operation could be impaired. For this reason, the central control, shown in greater detail in FIG. 2, includes a time-dependent mechanism for initiating the executions of predetermined subroutines in respective associated time intervals. An examination of FIG. 2 will also aid in understanding the order structure of the system. The specific orders or instructions which may be executed must be understood before proceeding with the details of the timetable program itself.

Instructions are successively transmitted from program store 102 to the central control over bus 6500. The address of the instruction required by the central control is transmitted from the program address register PAR over bus 6400 to the program store. The address is generally incremented in each cycle of operation by the add one circuit AO in order that successively numbered instructions be transmitted to the central control. One of the sequencers in block SEQ interrupts the normal execution of orders and controls a transfer to the timetable program at the beginning of every 5-millisecond interval. Thus every 5 milliseconds the first instruction in the timetable program is transmitted from the program store to the central control. Thereafter, since the address in the program address register PAR is continuously incremented the instructions in the timetable program are executed in sequence.

Communication is also provided between the central control and call store 103. An address transmitted over bus 6401 controls the reading of a call store word and its transmission over bus 6501 to buffer register BR in the central control, or the transmission over bus 6402 of the buffer register word to the call store and the writing of the word in the call store at the location whose address is transmitted over bus 6401. Communication is also possible with the peripheral units. Communication with the central pulse distributor 143 is possible over busses 6403 and 6404. Communication with various network units is possible over bus 6406. The central control governs the scanning of various points in the system to determine the required action. A scanner answer is returned over bus 6600 to the logic register LR.

Most of the equipment on the left side of FIG. 2 in the central control is used to determine the action taken by the central control. Each instruction, in addition to Hamming and parity bits for error detection and correction, includes an operation field and a data-address field. The "operation field" includes an operation code and an index register identity. Each instruction includes information in the following order: operation code, data-address (DA) field, index register identity. The three parts of each instruction are shown below separated by commas, the third part being omitted if no register specification is required. Initially the operation field portion of the program order word is gated into the auxiliary buffer order word register ABOWR, and the data-address field and the Hamming bits of the order word are gated into the buffer order word register BOWR directly; the auxiliary buffer order word register ABOWR is provided before the register BOWR to prevent an operation field being placed in the register BOWR before it has been cleared of the prior order word, a situation which will not occur with the data-address field and the Hamming bits. The data-address field is then transmitted to the index adder IA where indexing takes place if required. In the indexing step the DA field is modified by the addition to it of the word contained in one of the system registers, e.g., register XR. The sum derived by the index adder is the data or the address used in the execution of the order.

As multiple cycle overlap operation is possible in this system, an order word register OWR is provided in addition to the buffer order word register BOWR, together with their respective decoders OWD and BOWD; a mixed decoder MXD resolves conflicts between the program words in the two registers OWR and BOWR. The outputs of the decoders, together with selected clock signals from clock source CLK, are combined in the order combining gate circuit OCG which operates selected gates within the central control in the proper time sequence; the order combining gate circuit thus generates the proper sequences of gating signals to carry out the indexing cycle and the execution cycle of each of the sequence of orders in turn as they appear first in the buffer order word register BOWR and then in the order word register OWR.

A memory address decoder MAD decodes the addresses from the index adder IA and controls the order combining gate circuit OCG to direct properly addressed equipment, e.g., the program store, call store, or registers.

The internal data processing structure is built around two multiconductor busses, the unmasked bus UB and the masked bus MB, and a link for moving a data word from one register to another. The mask and complement circuit M&C connects the unmasked bus to the masked bus and provides means for logically operating upon the data as it passes from the former to the latter. The logical operation to be performed, which may include among others, product mask (AND), union mask (OR), exclusive-OR mask (EXCLUSIVE-OR), and complementing, is prescribed by the operation field of the instruction word as decoded by either the buffer order word decoder BOWD or the order word decoder OWD.

The central control is capable of executing decision orders. A decision is made to continue with the execution of the current sequence of orders or to transfer to a new sequence of orders. The decision is made by the decision logic circuit DEC in accordance with the order being processed. The order specifies the information to be examined and the basis for the decision. The information is obtained from the control homogeneity circuit CH or the control sign circuit CS, or selected outputs of the K logic circuit KLOG. The basis of the decision may be that the information examined is arithmetic zero, less than zero, greater than zero, etc.

As mentioned above, a plurality of sequence circuits SEQ are provided, which circuits share control of the data processing within the central control with the various decoders. These circuits contain counter circuits, the states of which define the gating actions to be performed by the sequence circuits. The sequence circuits control the time of operation and execution of various of the orders. For purposes of my invention, it need only be noted that one of the sequence circuits interrupts the normal execution of orders at predetermined intervals, as explained herein.

The program itself may be understood only after the five basic individual instructions comprising it are examined. The first type of instruction is MR, DA, RA. The R in the operation code represents one of the index registers included in the central control. These registers are the buffer register BR, the X register XR, the Y register YR, the Z register ZR, the K register KR, the F register FR, and the J register JR, all seen in FIG. 2. If the operation code, for example, is MX a word in the call store 103 is read into the X register. The particular word, i.e., its location, is identified in the DA field. However, the address in the DA field may be modified in the indexing step. The R in the third part of the instruction is one of the letters B, L, X, Y, Z, K, F or J. This letter represents one of the central control registers identified above and the contents of this register are added in the index adder IA to the address in the DA field. It is the call store word at the location represented by the sum address which is written in the register specified in the operation code. If the third part of the instruction is blank, the word read from the call store is that contained in the location whose address is specified in the DA field. If the letter A follows the index register identity the add 1 circuit AO increments the contents of the register specified by 1 after the indexing operation, the indexing operation being the addition of the contents of the index register specified to the DA field. Consider the following order: MK, TO, XA. When this order is executed the address TO is added to the contents of the X register and the call store word at the sum address is stored in the K register. After the contents of the X register are used in the indexing step they are incremented by 1.

The second instruction is of the type PMK, DA. The DA field identifies the location of the word to be read from the call store 103. The contents of the K register are ANDed (in K log) with the call store word read and the logical product replaces the previous contents of the K register. The bit written in the first position of the K register is a 1 only if the first bit in both the call store word read and the original K register word are 1's. Similar remarks apply to the other bit positions. Consider the following example: PMK, ACT. The word ACT is read from the call store. It is ANDed, bit by bit, (by K log) with the word contained in the K register. The resulting word is written in the K register and the former word in this register, used in the logical product operation, is erased.

The third order to consider is of the type RM, DA. (Although in the Dobl naier et al. system indexing and various options are available for RM and other orders being described at this point, in the illustrative program below indexing and options for these orders are not required.) The letter R represents one of the central control registers. The contents of the specified register are transmitted from the central control to the call store and are stored at the address represented in the DA field. The order XM, CNT, for example, controls the storage of the word in the X register XR in the location of the call store 103 representing the word CNT.

The fourth order is of the type T, DA, R. The machine transfers unconditionally to the instruction whose address is the sum of the DA field and the contents of the specified index register. If the DA field is 0, the transfer address is merely that contained in the specified register. For example, if the Y register contains the value P15 and the instruction is T, O, Y, a transfer is made to the instruction in the program store 102 at location P15.

The fifth and last type of instruction used in the timetable program is TZRFZ, DA. This instruction controls an examination by the detect first one circuit DFO of the bits in the K register. If one or more bits in the K register are 1's, the position of the rightmost 1 is stored in the F register, and that 1 in the K register is erased. The program then advances to the next instruction. Thus, if the K register contains some 1's, the rightmost one of which is in position 4, the number 4 is stored in the F register and the 1 in position 4 of the K register is erased and substituted by a 0. The machine advances to the next instruction in the timetable program. If, however, all of the bits in the K register are 0's, the machine transfers out of the timetable program to the instruction in the program store at the address identified in the DA field. It will be recalled that at the beginning of each 5-millisecond interval, the central control stops executing the normal flow of instructions transmitted to it from the program store and transfers to the timetable program. When the timetable program is completed, the machine has executed all of the subroutines which must be executed in the 5-millisecond interval under consideration. A return should be made to that point in the normal machine operation where the interrupt occurred and from which the transfer to the timetable program was made. When all of the bits in the K register are 0's, the timetable program has been completed and the machine must return to that point where the interrupt occurred. The TZRFZ instruction controls this return.

Before proceeding to the timetable program itself, FIGS. 3, 4 and 6 must be considered. Each of the tables in FIGS. 3 and 4 represents a series of data words contained in the call store 103. Each table contains not only the word entries but in addition the respective addresses at which they are stored. The addresses are shown by the use of symbolic codes rather than the actual numerical quantities which control the machine operation.

FIG. 3 is the transfer table for the timetable program. It is assumed that a maximum of 23 subroutines must be executed at fixed time intervals. In the illustrative embodiment of the invention there are only six subroutines which must be executed at fixed time intervals. Thus, 17 of the entries are left blank. Additional entries in the transfer table may be made if it is subsequently determined that other subroutines must be executed with the time precision required for subroutines A—F. The transfer table includes the address of the first instruction in each of the subroutines A—F. Location PO in the transfer table contains the address of the first instruction in subroutine A, location P1 contains the address of the first instruction in subroutine B, location P6 contains the address of the first instruction in subroutine C, etc.

The word STR in FIG. 6 is used in the timetable program to temporarily store a pattern of 1's and 0's that indicates which subroutines are due for execution during any 5-millisecond interval under consideration. The STR word is varied in the course of the program as the subroutines are executed. The CNT word represents a count of the 5-millisecond intervals. One of the numbers 0—24 (only 0—23 are used as will become apparent below) is stored in location CNT. The count is incremented at the beginning of each 5-millisecond interval, the count going from 0 to 24 and then starting once again with 0. A complete cycle takes 120 milliseconds.

The timetable for the timetable program is shown in FIG. 4. Each of the entries in this table contains 23 bits. The table includes an ACT word and 24 words at locations T0—T23. Each column in the T0—T23 table is associated with one of the addresses in the transfer table of FIG. 3. If a word in the transfer table is blank the corresponding column in the T0—T23 table contains no entries. Since only six of the locations in the transfer table contain entries, only six of the columns in the time-table contain entries. The activity word ACT contains a 1 in each position for which the respective column contains at least one 1 for the words T0—T23. If the activity bit of a column is 1, the 1's marked within the column designate the 5-millisecond intervals in each 120-millisecond cycle during which the associated subroutine is due for execution. For example, subroutine A, as seen from column 0, must be executed in the T0 5-millisecond interval, the T2 5-millisecond interval, the T4 5-millisecond interval, etc. of each 120-millisecond cycle. Subroutine C, as represented in column 6, must be executed only during the T16 5-millisecond interval, the seventeenth 5-millisecond interval of each 120-millisecond cycle. Subroutines D and E must be executed in every 5-millisecond interval. Subroutine F must be executed only once every 120-milliseconds, in the last 5-millisecond interval of each cycle. Subroutine B, as seen in column 1, must be executed in every 5-millisecond interval when subroutine A is not executed. Subroutines A and B may actually be the same, e.g., a dial pulse scan. A dial pulse scan for any line in the dialing state is required once every 10 milliseconds. If all lines in the dialing state are scanned during every other 5-millisecond interval, there by be insufficient time to scan all of them in 5 milliseconds. For this reason, half of them are scanned in alternate 5-millisecond intervals. Thus, subroutines A and B control the scanning of lines in the dialing state for dial pulses once every 10 milliseconds, with one-half of the lines being scanned in each series of alternate 5-millisecond intervals.

The actual timetable program is as follows:

1. MX, CNT
2. MK, TO, XA
3. XM, CNT
4. PMK, ACT
5. TZRFZ, CONT 1
6. KM, STR
7. MY, PO, F
8. T, O, Y
9. MK, STR
10. TZRFZ, CONT 1
11. KM, STR
12. MY, PO, F
13. T, O, Y

The interrupt sequencer included in sequencer SEQ, FIG. 2, does not control a transfer directly to instruction (1) at the beginning of each 5-millisecond interval. The interrupt sequencer controls a transfer to instruction INT 1 (FIG. 5). When the timetable program is finished the machine must return to that point in the normal program where the interrupt occurred. The interrupt may occur at any point in the program since it occurs at the beginning of each 5-millisecond interval. In order to return to the main program at the proper point after the timetable program is finished it is necessary temporarily to store all of the information in the central control in the call store 103. If after the timetable program is executed all of this information is returned to the central control the normal program may continue where it left off. Instructions INT 1 through INT (N—1) control the storage of the contents of the central control in the call store. When this storage is completed the machine transfers to the timetable program. Instruction INT N is T, (1). This instruction controls a transfer to instruction (1) in the timetable program.

The first instruction executed in the timetable program is MX, CNT. The contents of location CNT in the call store are read into register XR in the central control, FIG. 2. The value of the interval count identifies one of the 24 5-millisecond intervals in each 120-millisecond cycle. Assume initially that the CNT word is 0.

Instruction (2) is MK, TO, XA. The address TO is added to the value in the X register to obtain the address of the timetable entry to be read into register KR. The value in register XR is the CNT word and since it is initially 0 the first sum derived is merely T0. Thus the T0 word in FIG. 4 is read into register KR. After the indexing step the value in register XR is incremented by 1. The register thus contains the number 1.

The third instruction is XM, CNT. The new value of the interval count, 1, is written in location CNT of the call store 103. Initially the CNT word was 0. It is now 1. In the next 5-millisecond interval when the timetable program is executed once again the number 1 is stored in the X register when the first instruction is executed, and the contents of location T0+1, or T1, are stored in the K register. In the third step the CNT word is incremented once again, and in the third 5-millisecond interval the T2 word is stored in the K register rather than the T1 word. This process continues with successive ones of the words T0—T23 being stored in the K register in step 2 of the program at the beginning of successive 5-millisecond intervals.

The fourth instruction in the timetable program is PMK, ACT. The activity bits in the ACT word are transmitted from the call store to the central control. This word is ANDed with the T0 word in the K register on a bit-by-bit basis. The resulting word is stored in the K register and contains a 1 in every position in which both the timetable entry and the ACT word contain a 1. Each position marked by a 1 designates a subroutine that is due for execution in the first 5-millisecond period. During the first execution of the timetable program the bits in the K register which are 1's are in columns 0, 9 and 15. In subsequent 5-millisecond intervals the words T1 through T23 successively appear in the K register at the end of step (4).

It should be noted that step (4) is not essential for the timetable program. The ACT word contains a 1 in each column in which a 1 appears in at least one of the words T0 through T23. Thus the final word in the K register at the end of step (4) is the same as the word in this register at the end of step (2). The reason for including step (4) is the following. As described above each column is associated with one of the subroutines which is to be executed at fixed intervals of time. Suppose it is determined that a particular subroutine need not be executed with the time precision provided by the timetable program. In order that the subroutine not be executed with this precision were it not for the ACT word all of the 1's in the respective column in all of the words T0 through T23 would have to be changed to 0's. It is simpler to merely change the 1 in the respective position in the ACT word to a 0. If this bit is a 0 the respective subroutine will not be executed in the course of carrying out the timetable program because the respective bit in the K register at the end of step (4) will be a 0. If at a still later date it is decided once again to include the particular program among those to be executed at fixed time intervals it is only necessary to change the respective bit in the ACT word from a 0 back to a 1.

The fifth instruction in the timetable program is TZRFZ, CONT 1. If all of the bits in the K register are 0's the machine transfers to address CONT 1. The program (FIG. 5) comprising instructions CONT 1 through CONT N controls the restorage of all of the data in the central control which was transferred to the call store when the interrupt occurred at the beginning of the 5-millisecond interval. By returning this information to the central control the data processing may resume at the point where it left off. In the ordinary case however when step (5) is executed all of the bits in register KR will not be 0's. As seen in FIG. 4 each of the words T0 through T23 contains at least three 1's. Consequently when step (5) is executed a transfer will not be made out of the timetable program. However it is possible that the bits in the K register will all be 0's. If it is determined for example that the subroutines represented in columns 0, 9 and 15 in FIG. 4 need not be executed with time precision, the respective three 1's in the ACT word may be made 0's. In this case some of the words T0 through T23, after the logical product operation of step (4) is performed, will contain all 0's, and since no subroutine need be executed in certain 5-millisecond intervals the machine will resume with the normal data processing. As will become apparent below the transfer to address CONT 1 is required when all of the subroutines which must be executed in the 5-millisecond interval under consideration are completed. This transfer in most cases, and particularly with the timetable of FIG. 4, is controlled by instruction (10).

Assuming that the T0 through T23 words and the ACT word are as shown in FIG. 4, when instruction (5) is executed some of the positions in the K register will contain 1's. The TZRFZ instruction controls the setting of the rightmost 1 in the K register to 0. The instruction also controls the writing in the F register of the position number in the K register which contained the rightmost 1. The reason for writing the position number in the F register is to control the execution of the respective subroutine. The reason for erasing the rightmost 1 from the K register is to insure that the subroutine is executed only once.

The sixth instruction is KM, STR. The K register word, after being modified by the removal of the rightmost 1, is stored in location STR of the call store. This word will be examined again to determine the next rightmost 1 for the purpose of executing the respective subroutine.

The seventh instruction is MY, PO, F. The address P0 is added to the position number stored in the F register during the execution of instruction (7). The resulting sum is the address in the transfer table which contains the address of the first instruction in the first subroutine to be executed. As seen from FIG. 4 the T0 word is the first one operated upon. The rightmost 1 in this word is in column 0. Consequently in step (5) the number 0 is stored in the F register. In step (7) the derived sum of address P0 and the contents of the F register is merely the address P0. The MY order controls the writing of the contents of location P0 in the Y register.

Instruction (8) is T, 0, Y. The number 0 is added to the contents of the Y register and the sum is merely the value contained in the Y register. This is the address of the first instruction in subroutine A. The machine transfers to the instruction stored at this address and executes subroutine A. The last instruction in subroutine A is T, (9). When the A subroutine is completed the machine transfers to instruction (9) to continue with the timetable program. In fact, all of the subroutines A—F end with the instruction T, (9). Thus after each subroutine is executed a return is made to instruction (9) in the timetable program.

It has been assumed thus far that the timetable is that shown in FIG. 4 and that the CNT word was initially 0, i.e., the timetable program is being executed in the first 5-millisecond period of a 120-millisecond cycle. The first subroutine which is executed is subroutine A as described immediately above. After this subroutine is executed the machine returns to instruction (9) MK, STR. In step (6) the word stored in location STR was that word having a 1 in each position whose respective subroutine is to be executed in the 5-millisecond period being considered, after the rightmost 1 had been erased. This modified word is now retrieved and stored in the K register.

Instruction (10) is TZRFZ CONT 1, the same as instruction (5). The word now in the K register has a 1 only in columns 9 and 15 (assuming still that the first 5-millisecond interval in a complete cycle is under consideration). The number 9 is stored in the F register and the 1 in position 9 of the K register is erased.

Instruction (11) is KM, STR, the same as instruction (6). The K register word is once again stored in location STR. A 1 remains in only position 15.

Instruction (12) is MY, P0, F, the same as instruction (7). The number P0 is added to the number 9 in the F register and the word at the sum address P9 is stored in the Y register. This word is the address of the location in the transfer table containing the first instruction in subroutine D.

Instruction (13) is T, 0, Y, the same as instruction (8). A transfer is made to the first instruction in subroutine D and this subroutine is executed. The last instruction in the subroutine is, as described above, T (9). At the termination of the execution of subroutine D the system returns to instruction (9) in the timetable program. Again, the modified STR word is stored in the K register and the TZRFZ instruction is executed. This time the number 15 is stored in the F register and the 1 in position 15 in the K register is changed to a 0. The word stored in location STR when instruction (11) is executed now contains all 0's. Instruction (12) controls the transmission of the word stored in location P15 of the transfer table to the Y register. Instruction (13) controls a transfer to the first instruction in subroutine E. At the termination of this subroutine the machine again returns to instruction (9) of the timetable program. The STR word is stored in the K register. This time however the STR word contains all 0's and the TZRFZ instruction controls a transfer to location CONT 1. All three of subroutines A, D and E, those which must be executed in the first 5-millisecond interval of each 120-millisecond cycle, have been completed and the machine can return to the normal data processing. The subroutine comprising instructions CONT 1 through CONT N retrieves all of the central control data stored in the call store when the initial transfer to the timetable program was made. This data is returned to the central control and the normal data processing resumes where it left off.

At the beginning of the second 5-millisecond interval the sequence is similar except that the CNT word which is moved to the X register in step (1) is 1. Instruction (2) controls the storage of the word in location T1 in register KR, rather than the word in location T0. Subroutines B, D and E are executed. The process continues until all of the words T0 through T23 have been operated upon in successive 5-millisecond intervals. In the last 5-millisecond interval subroutines B, D, E and F are executed. Subroutine F is executed only once in each 120-millisecond cycle, and it is the last subroutine executed. It will be recalled that at the beginning of each cycle the CNT word must be 0. When instructions (2) and (3) are executed in the 24th 5-millisecond interval of each cycle the CNT word after being incremented is equal to 24. Subroutine F merely controls the substitution of the number 0 in location CNT of the call store so that the cycle may begin once again at the beginning of the next 5-millisecond interval, the first in the next 120-millisecond cycle.

The method of the invention has been described with reference to a particular data processing system. In general other data processing systems will not include the same order structure as that of the Doblmaier et al. telephone switching system. However the same method may be used in other systems. The basic technique may be best understood by analyzing the two tables of FIGS. 3 and 4. The transfer table provides access to the particular subroutines which must be executed when it is determined that these subroutines are required. The timetable may be thought of as a matrix. Each entry in the table is associated with one of the time intervals in each cycle and with one of the subroutines which may have to be executed at fixed time intervals. That is, each entry represents time-program information. In each time interval all of the time-program entries associated with the time interval under consideration are examined. If any of these entries indicates that a subroutine is to be executed at this time the program coordinate of the time-program entry represents the particular subroutine. By referring to the transfer table access may be gained to the instructions in this subroutine. Thus although the invention has been described with reference to a particular embodiment it is to be understood that the arrangement is merely illustrative of the application of the principles of the invention. Numerous other arrangements may be devised by those skilled in the art without departing from the spirit and scope of the invention.

What I claim is:

1. A method of controlling the executions of predetermined program subroutines at predetermined fixed time intervals in a data processing system comprising the steps of:

1. storing in successively addressed locations of a first table the respective transfer addresses of said predetermined program subroutines,
2. storing in a second table a respective word for each of a plurality of fixed time intervals of the same duration, each bit position in each of said words being associated with one of said predetermined program subroutines and containing a bit of predetermined value if the associated subroutine is to be executed in the time interval represented by the respective word,
3. examining the respective word in said second table at the beginning of each of said fixed time intervals, said words being examined in sequence,
4. determining the positions in the examined word containing bits of said predetermined value,
5. sequentially adding the numbers of the positions in said examined word containing bits of said predetermined value to the address of the location in said first table containing the first transfer address to derive the addresses in said first table of the locations containing the transfer addresses of the predetermined subroutines to be executed, and
6. sequentially transferring to the respective transfer addresses contained in said derived location addresses in said first table to control the executions of all of the predetermined program subroutines to be executed in the fixed time interval whose respective word in said second table has been examined.

2. A method of controlling the executions of predetermined program subroutines at predetermined fixed time intervals in a data processing system comprising the steps of:

1. storing in a first table the respective transfer addresses of said predetermined program subroutines,
2. storing in a second table a respective word for each of a plurality of fixed time intervals of the same duration, each bit position in each of said words being associated with one of said predetermined program subroutines and containing a bit of predetermined value if the associated subroutine is to be executed in the time interval represented by the respective word,
3. examining the respective word in said second table at the beginning of each of said fixed time intervals, said words being examined in sequence,
4. determining the positions in the examined word containing bits of said predetermined value,
5. sequentially retrieving the transfer addresses in said first table corresponding to the positions in said examined word containing bits of said predetermined value, and
6. sequentially transferring to said retrieved transfer addresses to control the executions of all the predetermined program subroutines to be executed in the fixed time interval whose respective word in said second table has been examined.

3. A method of controlling the executions of predetermined program subroutines at predetermined fixed time intervals in a data processing system in accordance with claim 2 wherein the words in said second table are contained in successively addressed locations, and step (3) comprises the substeps of:

3*a*. maintaining a count of time intervals and incrementing said count during each of said fixed time intervals, 3*b*. adding the value of the count maintained to the address of the first location in said second table to derive a sum address, and 3*c*. examining at the beginning of each of said fixed time intervals the word in said second table which is contained in the location having the derived sum address.

4. A method of controlling the executions of predetermined program subroutines at predetermined fixed time intervals in a data processing system in accordance with claim 2 wherein said data processing system normally operates in accordance with the instructions in a predetermined program further comprising the steps of 7. temporarily storing the identity of the instruction in said predetermined program which would otherwise be executed but for the performance of steps (3)—(6), and
8. executing said temporarily stored instruction after steps (3)—(6) have been performed.

5. A method of controlling the executions of predetermined program subroutines at predetermined fixed time intervals in a data processing system comprising the steps of:

1. storing a respective word for each of a plurality of fixed time intervals of the same duration, each bit position in each of said words being associated with one of said predetermined program subroutines and containing a bit of predetermined value if the associated subroutine is to be executed in the time interval represented by the respective word,
2. examining the respective word at the beginning of each of said fixed time intervals, said words being examined in sequence,
3. determining the positions in the examined word containing bits of said predetermined value, and
4. sequentially executing the predetermined program subroutines in the fixed time interval whose respective word has been examined which correspond to the positions in said word containing bits of said predetermined value.

6. A method of controlling the executions of predetermined program subroutines at predetermined fixed time intervals in a data processing system in accordance with claim 5 wherein the system includes a list of transfer addresses, each address identifying a particular one of said subroutines, and step (4) comprises the substeps of:

4*a*. selecting the transfer addresses in said list whose associated subroutines correspond to the positions in said examined word containing bits of said predetermined value, and 4*b*. successively transferring to the selected transfer addresses to control the executions of the respective subroutines.

7. A method of controlling the executions of predetermined program subroutines at predetermined fixed time intervals in a data processing system comprising the steps of:

1. storing a respective word for each of a plurality of fixed time intervals, each bit position in each of said words being associated with one of said predetermined program subroutines and containing a bit of predetermined value if the associated subroutine is to be executed in the time interval represented by the respective word,
2. placing in a register the respective word in said table at the beginning of each of said fixed time intervals,
3. determining the positions in said register containing bits of said predetermined value, and
4. sequentially executing the subroutines which correspond to the positions in said register containing bits of said predetermined value and erasing from said register said bits of predetermined value as said subroutines are sequentially executed until all of said bits of predetermined value have been erased from said register.

8. A method of controlling the operation of a data processor comprising the steps of:

1. storing a respective word for each of a plurality of repetitive timed intervals, each word identifying predetermined program subroutines to be executed in the time interval represented by the respective word,
2. sequentially executing successive instructions in accordance with a predesigned program,
3. interrupting the executions of the instructions in said predesigned program at the beginning of each of said repetitive time intervals,
4. examining the respective stored word at the beginning of each of said time intervals,
5. determining from the examined word the predetermined subroutines to be executed in the respective time interval,
6. sequentially executing in each time interval the predetermined program subroutines identified by the respective examined word, and
7. resuming the executions of the instructions in said predesigned program in each of said time intervals after the respective predetermined program subroutines have been executed.

9. A method of controlling the executions of predetermined program subroutines during repetitive time intervals in a data processing system comprising the steps of:

1. storing data each piece of which has a subroutine identity coordinate and a time interval identity coordinate and being of a predetermined value if the respective subroutine is to be executed during the respective time interval,
2. examining at the beginning of each of said time intervals all pieces of said data having the respective time interval identity coordinate, and
3. sequentially executing in each time interval the subroutines corresponding to the subroutine identity coordinates of the examined pieces of data having said predetermined value.

Disclaimer and Dedication 3,582,896.—*Sigmund Silber*, Elizabeth, N.J. METHOD OF CONTROL FOR A DATA PROCESSOR. Patent dated June 1, 1971. Disclaimer and dedication filed Aug. 2, 1971, by the assignee, *Bell Telephone Laboratories, Incorporated.*

Hereby disclaims and dedicates to the Public the portion of the term of the patent subsequent to Dec. 1, 1987.

[*Official Gazette November 9, 1971.*]